United States Patent
Zhou et al.

(10) Patent No.: US 9,491,021 B2
(45) Date of Patent: Nov. 8, 2016

(54) TERMINAL-TO-TERMINAL COMMUNICATION METHOD AND TERMINAL

(71) Applicant: Huawei Technologies Co., Ltd., Shenzhen (CN)

(72) Inventors: Han Zhou, Beijing (CN); Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/579,037

(22) Filed: Dec. 22, 2014

(65) Prior Publication Data

US 2015/0110209 A1 Apr. 23, 2015

Related U.S. Application Data

(63) Continuation of application No. PCT/CN2013/073810, filed on Apr. 7, 2013.

(30) Foreign Application Priority Data

Jun. 20, 2012 (CN) .......................... 2012 1 0205421

(51) Int. Cl.
*H04W 56/00* (2009.01)
*H04W 92/18* (2009.01)
(Continued)

(52) U.S. Cl.
CPC .......... *H04L 27/2627* (2013.01); *H04W 4/005* (2013.01); *H04W 24/02* (2013.01);
(Continued)

(58) Field of Classification Search
CPC ... H04W 76/023; H04W 4/005; H04W 4/02; H04W 56/00; H04W 56/0065; H04W 56/003; H04W 84/18; H04W 92/18; H04W 24/02; H04J 11/003; H04L 5/1469
See application file for complete search history.

(56) References Cited

U.S. PATENT DOCUMENTS 6,574,266 B1 6/2003 Haartsen
9,019,921 B2 * 4/2015 Lee .................. H04W 56/00
370/329
(Continued)

FOREIGN PATENT DOCUMENTS

CN 1371583 A 9/2002
CN 101420261 A 4/2009
(Continued)

OTHER PUBLICATIONS

Foreign Communication From a Counterpart Application, European Application No. 13806823.4, Extended European Search Report dated Apr. 2, 2015, 7 pages.
(Continued)

*Primary Examiner* — Michelle M Koeth
(74) *Attorney, Agent, or Firm* — Conley Rose, P.C.; Grant Rodolph

(57) ABSTRACT

A terminal-to-terminal communication method and a terminal. The method includes: receiving, by a first terminal, data in a first OFDM symbol, where the data is sent by a second terminal in a second OFDM symbol, the first OFDM symbol is synchronized by the first terminal according to first timing information sent by a base station, and the second OFDM symbol is synchronized by the second terminal according to second timing information sent by the second terminal; and if the first OFDM symbol is not synchronized with the second OFDM symbol, skipping processing, by the first terminal, residual data that is sent by the second terminal in the second OFDM symbol and that exceeds a time indicated by the first OFDM symbol.

7 Claims, 6 Drawing Sheets

(51) Int. Cl.
*H04W 24/02* (2009.01)
*H04W 76/02* (2009.01)
*H04L 27/26* (2006.01)
*H04W 4/00* (2009.01)
*H04W 4/02* (2009.01)

(52) U.S. Cl.
CPC ......... *H04W 56/00* (2013.01); *H04W 56/003* (2013.01); *H04W 56/0065* (2013.01); *H04W 76/023* (2013.01); *H04W 92/18* (2013.01); *H04W 4/02* (2013.01)

(56) References Cited

U.S. PATENT DOCUMENTS

| | | | |
|---|---|---|---|
| 2002/0126706 A1 | 9/2002 | Laroia et al. | |
| 2003/0007504 A1* | 1/2003 | Berry | H04L 69/16 370/465 |
| 2006/0199546 A1* | 9/2006 | Durgin | H04B 17/318 455/67.11 |
| 2008/0031220 A1 | 2/2008 | Li et al. | |
| 2009/0010231 A1 | 1/2009 | Laroia et al. | |
| 2010/0128642 A1* | 5/2010 | Bossler | H04W 56/009 370/280 |
| 2011/0182280 A1 | 7/2011 | Charbit et al. | |
| 2013/0316727 A1* | 11/2013 | Edge | H04W 4/02 455/456.1 |
| 2015/0131749 A1* | 5/2015 | Slomina | H04J 11/005 375/260 |

FOREIGN PATENT DOCUMENTS

| | | |
|---|---|---|
| CN | 101690352 A | 3/2010 |
| CN | 102165840 A | 8/2011 |
| EP | 2849494 A1 | 3/2015 |

OTHER PUBLICATIONS

Foreign Communication From a Counterpart Application, PCT Application No. PCT/CN2013/073810, English Translation of International Search Report dated Jul. 11, 2013, 2 pages.

Foreign Communication From a Counterpart Application, PCT Application No. PCT/CN2013/073810, English Translation of Written Opinion dated Jul. 11, 2013, 4 pages.

Foreign Communication From a Counterpart Application, Chinese Application No. 201210205421.9, Chinese Office Action dated Dec. 1, 2015, 6 pages.

* cited by examiner

TERMINAL-TO-TERMINAL COMMUNICATION METHOD AND TERMINAL

CROSS-REFERENCE TO RELATED APPLICATIONS

This application is a continuation of International Application No. PCT/CN2013/073810, filed on Apr. 7, 2013, which claims priority to Chinese Patent Application No. 201210205421.9, filed on Jun. 20, 2012, both of which are hereby incorporated by reference in their entireties.

TECHNICAL FIELD

The present invention relates to wireless communications technologies, and in particular, to a terminal-to-terminal communication method and a terminal.

BACKGROUND

Direct communication between a terminal and a terminal (Device to Device (D2D)) enables direct communication between terminal devices without requiring any intermediate infrastructure. Therefore, the direct communication between terminal devices can use spectrum resources more efficiently, increase a capacity of a cellular network, and reduce overheads of control signaling of a base station.

Although all systems such as wireless fidelity (Wi-Fi), Bluetooth® (BT) and an ad-hoc network (Ad-Hoc) in the prior art may implement D2D communication, a complex maintenance problem of timing occurs. This problem is: Receive timing of a terminal that receives a D2D signal needs to align with uplink timing or downlink timing of a terminal that sends the D2D signal at the peer end. During D2D communication, a terminal maintains not only its transmit timing but also its receive timing, resulting in complex maintenance of timing and high energy consumption of the terminal.

SUMMARY

In view of this, embodiments of the present invention provide a terminal-to-terminal communication method, so as to resolve a complex maintenance problem of timing during D2D communication.

According to one aspect, an embodiment of the present invention provides a terminal-to-terminal communication method, including: receiving, by a first terminal, data in a first orthogonal frequency division multiplexing (OFDM) symbol, where the data is sent by a second terminal in a second OFDM symbol, the first OFDM symbol is synchronized by the first terminal according to first timing information sent by a base station, and the second OFDM symbol is synchronized by the second terminal according to second timing information sent by the base station; and if the first OFDM symbol is not synchronized with the second OFDM symbol, skipping processing, by the first terminal, residual data that is sent by the second terminal in the second OFDM symbol and that exceeds a time indicated by the first OFDM symbol.

In the foregoing terminal-to-terminal communication method, before the receiving, by a first terminal, data in a first OFDM symbol, the method further includes: determining, by the first terminal, a distance between the first terminal and the second terminal; and determining, by the first terminal according to a correspondence between a distance and a cyclic prefix type of an OFDM symbol, a cyclic prefix type of an OFDM symbol corresponding to the distance; where accordingly, the first OFDM symbol is an OFDM symbol that has the determined cyclic prefix type.

In the foregoing terminal-to-terminal communication method, the correspondence between a distance and a cyclic prefix type of an OFDM symbol includes: if the distance is less than or equal to a first preset distance, the cyclic prefix type of the OFDM symbol is a normal cyclic prefix type or an extended cyclic prefix type; or if the distance is greater than a first preset distance and less than or equal to a second preset distance, the cyclic prefix type of the OFDM symbol is an extended cyclic prefix type.

In the foregoing terminal-to-terminal communication method, the determining, by the first terminal, a distance between the first terminal and the second terminal includes: acquiring, by the first terminal, location information of the second terminal; and determining, by the first terminal, the distance between the first terminal and the second terminal according to the location information.

In the foregoing terminal-to-terminal communication method, where skipping processing, by the first terminal, residual data that is sent by the second terminal in the second OFDM symbol and that exceeds a time indicated by the first OFDM symbol if the first OFDM symbol is not synchronized with the second OFDM symbol, includes: if the first OFDM symbol is not synchronized with the second OFDM symbol, receiving, by the first terminal in a next OFDM symbol of the first OFDM symbol, the residual data that is sent by the second terminal in the second OFDM symbol and that exceeds the time indicated by the first OFDM symbol, but skipping processing the residual data.

In the foregoing terminal-to-terminal communication method, the skipping processing, by the first terminal, residual data that is sent by the second terminal in the second OFDM symbol and that exceeds a time indicated by the first OFDM symbol if the first OFDM symbol is not synchronized with the second OFDM symbol, includes: if the first OFDM symbol is not synchronized with the second OFDM symbol, skipping receiving and skipping processing, in a next OFDM symbol of the first OFDM symbol, the residual data that is sent by the second terminal in the second OFDM symbol and that exceeds the time indicated by the first OFDM symbol.

According to another aspect, an embodiment of the present invention provides a terminal, including: a receiving module configured to receive data in a first OFDM symbol, where the data is sent, in a second OFDM symbol, by a peer terminal that performs terminal-to-terminal communication with the terminal, the first OFDM symbol is synchronized by the terminal according to first timing information sent by a base station, and the second OFDM symbol is synchronized by the peer terminal according to second timing information sent by the base station; and a processing module configured to, if the first OFDM symbol is not synchronized with the second OFDM symbol, skip processing residual data that is sent by the peer terminal in the second OFDM symbol and that exceeds a time indicated by the first OFDM symbol.

The foregoing terminal further includes: a distance determining module configured to determine a distance between the terminal and the peer terminal; a storing module configured to store a correspondence between a distance and a cyclic prefix type of an OFDM symbol; and a cyclic prefix type determining module configured to determine, according to the correspondence between a distance and a cyclic prefix type of an OFDM symbol, a cyclic prefix type of an OFDM symbol that corresponds to the distance and is determined by the distance determining module; where accordingly, the receiving module configured to receive data in a first OFDM symbol that has the determined cyclic prefix type.

In the foregoing terminal, the distance determining module includes: a location acquiring unit configured to acquire location information of the peer terminal; and a determining unit configured to determine the distance between the terminal and the peer terminal according to the location information.

In the foregoing terminal, the processing module is specifically configured to: if the first OFDM symbol is not synchronized with the second OFDM symbol, receive, in a next OFDM symbol of the first OFDM symbol, residual data that is sent by the peer terminal in the second OFDM symbol and that exceeds the time indicated by the first OFDM symbol, but skip processing the residual data.

In the foregoing terminal, the processing module is specifically configured to: if the first OFDM symbol is not synchronized with the second OFDM symbol, skip receiving and skip processing, in a next OFDM symbol of the first OFDM symbol, residual data that is sent by the peer terminal in the second OFDM symbol and that exceeds the time indicated by the first OFDM symbol.

By using the foregoing solutions, two terminals in D2D communication may send and receive data separately at their uplink timing or downlink timing, thereby avoiding a problem in the prior art that a terminal at a receive end needs to maintain receive timing by using a complex synchronization process, and simplifying maintenance of D2D communication timing. In addition, by using a terminal-to-terminal communication method provided by embodiments of the present invention, a terminal does not need to change its receive timing even if a peer terminal of the communication changes.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present application. All other embodiments obtained by persons of ordinary skill in the art based on the embodiments of the present application without creative efforts shall fall within the protection scope of the present application.

In addition, a character "/" in this specification generally indicates that front and rear association objects are of an "or" relationship.

Figure 1:
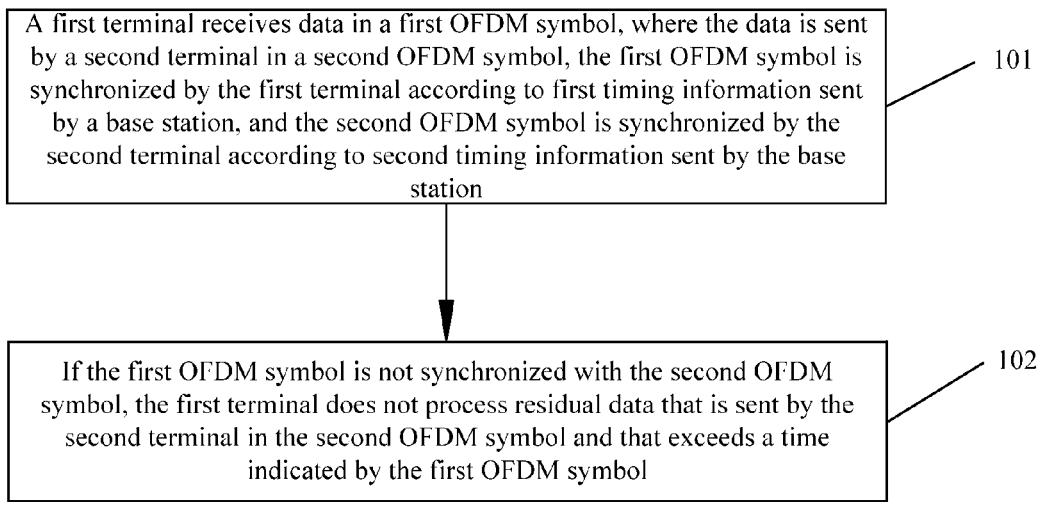
FIG. 1 is a schematic flowchart of a terminal-to-terminal communication method according to a first embodiment of the present invention.

As shown in FIG. 1, a first embodiment of the present invention provides a terminal-to-terminal communication method. As shown in the figure, the terminal-to-terminal communication method described in the first embodiment includes:

Step 101: A first terminal receives data in a first OFDM symbol, where the data is sent by a second terminal in a second OFDM symbol, the first OFDM symbol is synchronized by the first terminal according to first timing information sent by a base station, and the second OFDM symbol is synchronized by the second terminal according to second timing information sent by the base station.

When the base station sends the first timing information to the first terminal, if the first timing information is a synchronization signal, the first terminal performs synchronization according to the synchronization signal to obtain downlink timing; and if the first timing information is timing advance information, the first terminal performs synchronization according to the timing advance information and downlink timing to obtain uplink timing. Similarly, when the base station sends the second timing information to the second terminal, if the second timing information is a synchronization signal, the second terminal performs synchronization according to the synchronization signal to obtain downlink timing; and if the second timing information is timing advance information, the second terminal performs synchronization according to the timing advance information and downlink timing to obtain uplink timing.

Figure 2:
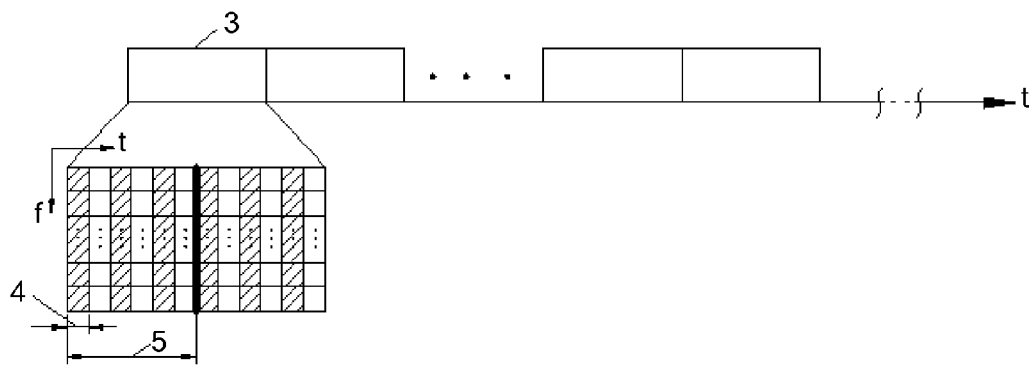
FIG. 2 is a schematic diagram of a specific timing structure instance of terminal uplink timing and downlink timing.

Specifically, timing structures of the uplink timing and downlink timing, as shown in FIG. 2, both include a subframe 3. Each subframe includes two timeslots 5, and each timeslot includes seven OFDM symbols. FIG. 2 shows only a case in which a cyclic prefix of an OFDM symbol is a normal cyclic prefix type. If a cyclic prefix of an OFDM symbol is an extended cyclic prefix type, each timeslot includes seven OFDM symbols. It can be learnt based on the foregoing description that, in this step, the second terminal sends data at its uplink timing or downlink timing, and the first terminal receives, at its uplink timing or downlink timing, the data sent by the second terminal.

Step 102: If the first OFDM symbol is not synchronized with the second OFDM symbol, the first terminal does not process residual data that is sent by the second terminal in the second OFDM symbol and that exceeds a time indicated by the first OFDM symbol.

Figure 3:
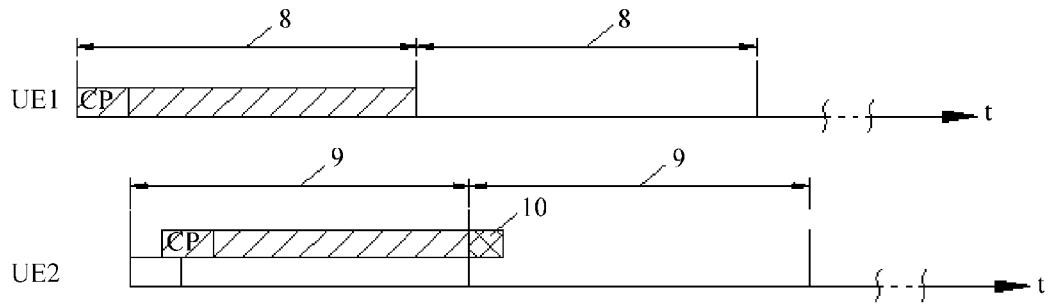
FIG. 3 is a schematic diagram of a specific instance in step 102 that is executed in a terminal-to-terminal communication method according to a first embodiment of the present invention.

Specifically, as shown in FIG. 3, a D2D terminal user equipment (UE)1 sends the data in an OFDM symbol 8 at its uplink timing or downlink timing, and a D2D terminal UE2 receives the data in an OFDM symbol 9 at its uplink timing or downlink timing. If the OFDM symbol 8 is not synchronized with the OFDM symbol 9, the D2D terminal UE2 does not process residual data 10, that is, data in a grid area of the figure, which is sent by the D2D terminal UE1 in the OFDM symbol 8 and exceeds a time indicated by the OFDM symbol 9.

In the first embodiment, a solution in which two D2D communication terminals both send and receive data at their uplink timing or downlink timing is used, thereby avoiding a problem in the prior art that a D2D terminal at a receive end needs to maintain receive timing by using a complex synchronization process, and simplifying maintenance of D2D communication timing. In addition, in the first embodiment, a manner of skipping processing residual data is further used, thereby avoiding an overhead problem in the prior art that a D2D communication terminal requires an receiver (RX)/transmitter (TX) switch time between receiving a signal and sending a signal. In the first embodiment, the residual data is not processed, so that a terminal may immediately start to send a signal in a next symbol at its uplink timing or downlink timing, without requiring the RX/TX switch time in the prior art, thereby reducing waste of time. In addition, because a technical solution provided in the first embodiment is used, a D2D terminal at a receive end does not need to align with transmit timing of a D2D terminal at a transmit end when receiving a signal. Therefore, the technical solution in this embodiment is applicable to a multiple-transmitting single-receiving or multiple-transmitting multiple-receiving scenario.

Further, for the description in step 102 in the foregoing first embodiment, that is, if the first OFDM symbol is not synchronized with the second OFDM symbol, the first terminal does not process residual data that is sent by the second terminal in the second OFDM symbol and that exceeds the time indicated by the first OFDM symbol, which specifically may be one of the following two cases:

In the first case, if the first OFDM symbol is not synchronized with the second OFDM symbol, the first terminal receives, in a next OFDM symbol of the first OFDM symbol, residual data that is sent by the second terminal in the second OFDM symbol and that exceeds the time indicated by the first OFDM symbol, but does not process the residual data.

In the second case, if the first OFDM symbol is not synchronized with the second OFDM symbol, the first terminal does not receive and not process, in a next OFDM symbol of the first OFDM symbol, residual data that is sent by the second terminal in the second OFDM symbol and that exceeds the time indicated by the first OFDM symbol.

Figure 4:
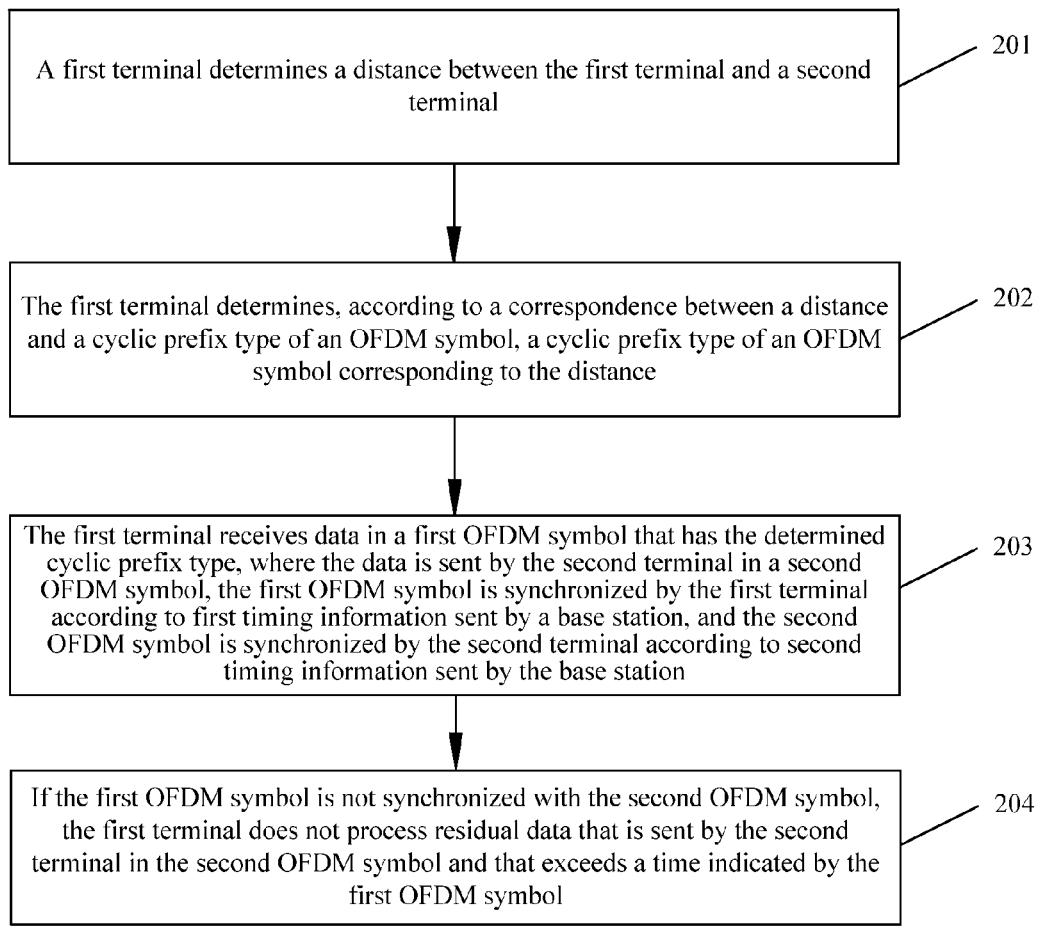
FIG. 4 is a schematic flowchart of a terminal-to-terminal communication method according to a first embodiment of the present invention.

As shown in FIG. 4, a second embodiment of the present invention provides a terminal-to-terminal communication method. The terminal-to-terminal communication method described in the second embodiment includes:

Step 201: A first terminal determines a distance between the first terminal and a second terminal.

The first terminal acquires location information of the second terminal. The first terminal determines the distance between the first terminal and the second terminal according to the location information. The first terminal may acquire, by receiving a discovery subframe sent by the second terminal, location information of the second terminal. The discovery subframe carries the location information of the second terminal. Alternatively, the first terminal acquires the location information of the second terminal by using a global positioning system (GPS).

Step 202: The first terminal determines, according to a correspondence between a distance and a cyclic prefix type of an OFDM symbol, the cyclic prefix type of the OFDM symbol corresponding to the distance.

To eliminate interchannel interference (ICI) caused by multipath propagation, in an actual system, before an OFDM symbol is sent to a channel, a CP is first added to the OFDM symbol, and then the OFDM symbol is sent to the channel for transmission. CPs are classified into CPs of a normal CP type and CPs of an extended CP type according to type. As described in the following Table 1, the correspondence between a distance and a cyclic prefix type of an OFDM symbol includes: If the distance is less than or equal to a first preset distance, the cyclic prefix type of the OFDM symbol is a normal cyclic prefix type or an extended cyclic prefix type; or if the distance is greater than a first preset distance and is less than or equal to a second preset distance, the cyclic prefix type of the OFDM symbol is an extended cyclic prefix type.

TABLE 1

Correspondence between a distance and a cyclic prefix type of an OFDM symbol

| Distance (m) | Cyclic prefix type of an OFDM symbol |
| --- | --- |
| Less than or equal to a first preset distance | Normal cyclic prefix type or extended cyclic prefix type |
| Greater than a first preset distance and less than or equal to a second preset distance | Extended cyclic prefix type |

Step 203: The first terminal receives data in the first OFDM symbol that has the determined cyclic prefix type, where the data is sent by a second terminal in a second OFDM symbol, the first OFDM symbol is synchronized by the first terminal according to first timing information sent by a base station, and the second OFDM symbol is synchronized by the second terminal according to second timing information sent by the base station.

Figure 5:
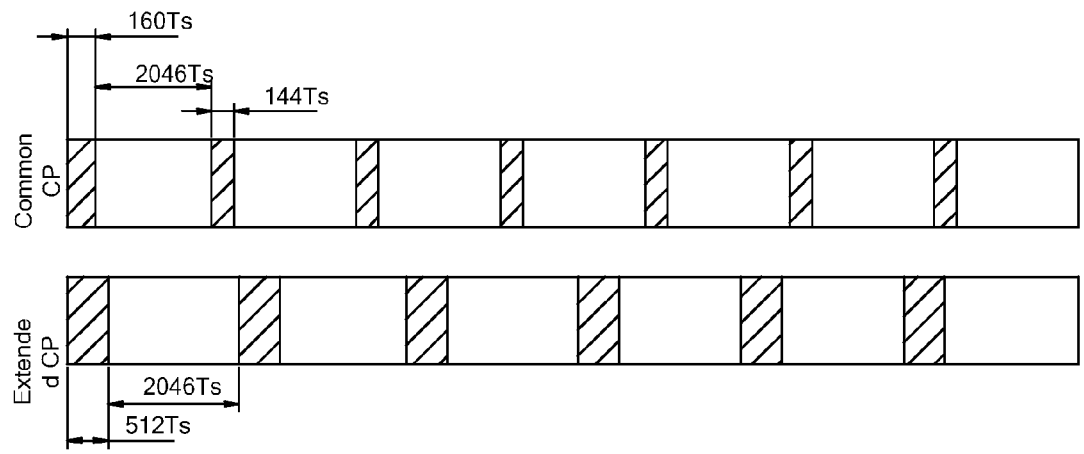
FIG. 5 is a schematic diagram illustrating comparison between a timeslot of normal cyclic prefix (CP) type and a timeslot of extended CP type.

Actually, to avoid interference, of different D2D terminal signals, uplink signals of other cellular terminals or downlink signals of base stations, with D2D communication signals between the first terminal and the second terminal, two conditions need to be ensured. In the first condition, a time at which the first terminal receives data sent by the second terminal must be later than the moment at which the first terminal starts receiving a signal at uplink timing or downlink timing. In the second condition, a delay that data sent by the second terminal arrives at the first terminal falls within a CP range of an OFDM symbol corresponding to a signal received by the first terminal at uplink timing or downlink timing. Therefore, for long-distance D2D communication, to meet the foregoing conditions, the first terminal needs to choose to receive data in an OFDM symbol of an extended CP type. The time in a CP segment of an OFDM symbol of the extended CP type is longer than the time in a CP segment of an OFDM symbol of a CP type. FIG. 5 shows a schematic diagram of comparison between timeslot instances of two CP types. For a timeslot of a normal CP type, a CP length of a start OFDM symbol is 160 Ts and a tail length of the OFDM symbol is 2048 Ts, and CP lengths of other OFDM symbols are all 144 Ts and tail lengths of the other OFDM symbols are all 2048 Ts, then duration of a timeslot of a normal CP type is 7×2048 Ts+6×144 Ts+1×160 Ts=15360 Ts=0.5 ms. For a timeslot of an extended CP type, a CP length of each OFDM symbol is 512 Ts, and a tail length of the OFDM length is 2048 Ts, then duration of a timeslot of an extended CP type is 6×2048 Ts+6×512 Ts=15360 Ts=0.5 ms.

Step 204: If the first OFDM symbol is not synchronized with the second OFDM symbol, the first terminal does not process residual data that is sent by the second terminal in the second OFDM symbol and that exceeds a time indicated by the first OFDM symbol.

In the second embodiment, a D2D terminal determines, according to an actual distance between the terminal and a peer D2D terminal, whether the D2D terminal receives data in an OFDM symbol of a normal CP type or an OFDM symbol of an extended CP type, so as to improve anti-interference performance of D2D communications terminals in receiving and sending data separately at their uplink timing or downlink timing, and to effectively avoid interference between communication signals of different D2D terminals and interference with an uplink signal of a cellular terminal or a downlink signal of a base station. The second embodiment is applicable to a timing structure, which includes both an OFDM symbol of a normal CP type and an OFDM symbol of an extended CP type, of a cell of the base station.

It should be noted here that, the foregoing two conditions may be obtained based on the following justification process.

In the first condition, the time at which a receiving terminal receives data sent by a sending terminal must be later than the moment at which the receiving terminal starts receiving a signal at uplink timing or downlink timing. A justification process that may use a technical solution provided in embodiments of the present invention to meet the first condition is as follows:

1. Scenario in which D2D Communication Shares an Uplink Frequency of Cellular Communication.

Figure 6:
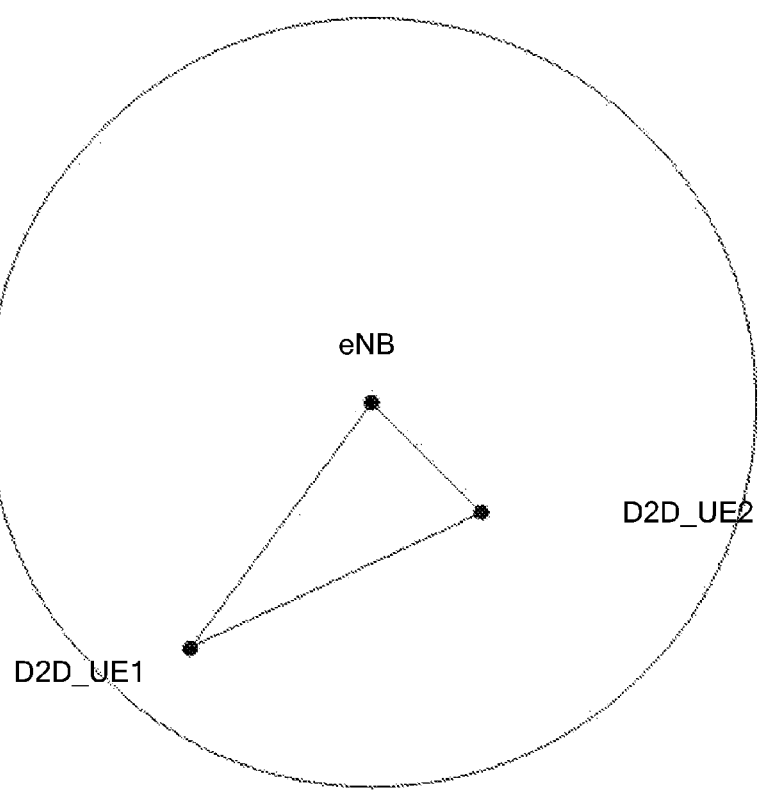
FIG. 6 is a schematic diagram of a specific instance of a location relationship between two terminals in terminal-to-terminal communication.
Figure 7:
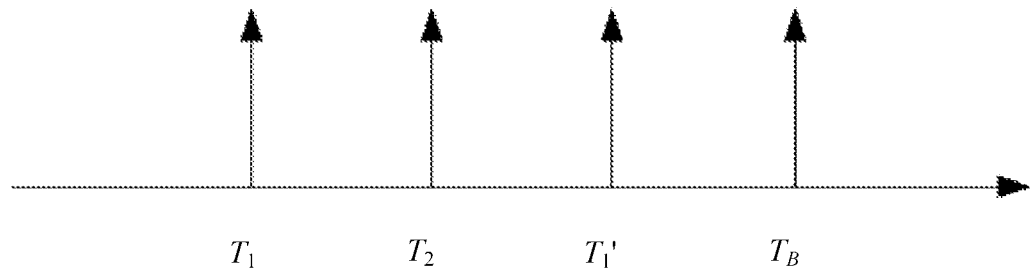
FIG. 7 is a schematic diagram of a timing relationship that two terminals in terminal-to-terminal communication share an uplink frequency of cellular communication.

As shown in FIG. 6, a first terminal D2D_UE1 and a second terminal D2D_UE2 perform D2D communication in a cell to which a base station eNB belongs. It is assumed that D2D_UE1 sends data at its uplink timing $T_1$ moment, D2D_UE2 receives, at its uplink timing $T_2$ moment, the data sent by D2D_UE1, and the data sent by D2D_UE1 arrives at D2D_UE2 at $T_1'$ moment, as shown in FIG. 7. An uplink timing difference between D2D_UE1 and D2D_UE2 is:

$$\Delta T = T_2 - T_1 = (T_B - T_1) - (T_B - T_2) \quad (1)$$

In the foregoing formula (1), $T_B$ is timing of the base station, $T_B - T_1$ is a time required for data transmission between D2D_UE1 and the base station, and $T_B - T_2$ is a time required for data transmission between D2D_UE2 and the base station. Then, $T_1' - T_1$ is a time required for data transmission between D2D_UE1 and D2D_UE2. With reference to FIG. 6, according to a geometric theorem, the following may be obtained: a distance between D2D_UE2 and the base station minus a distance between D2D_UE1 and the base station is less than a distance between D2D_UE1 and D2D_UE2, that is:

$$(T_B - T_1) \times V - (T_B - T_2) \times V \leq (T_1' - T_1) \times V \quad (2)$$

$$T_2 \leq T_1' \quad (3)$$

In the foregoing formula (2), V is a speed of data transmission. The foregoing formula (3) may be obtained by deduction according to the formula (2). It can be learnt from the foregoing description that, the time $T_1'$ that data sent by D2D_UE1 arrives at D2D_UE2 must be later than the uplink timing $T_2$ of D2D_UE2 (as shown in FIG. 7). In this case, D2D_UE2 may completely receive the data sent by D2D_UE1.

2. Scenario in which D2D Communication Shares a Downlink Frequency of Cellular Communication.

Figure 8:
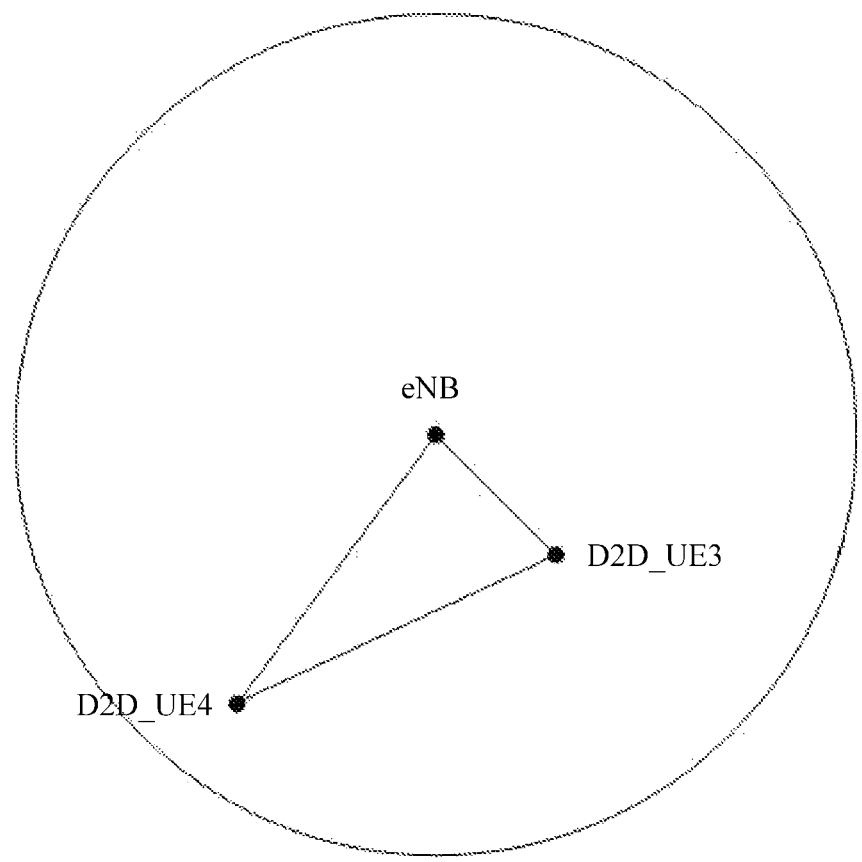
FIG. 8 is a schematic diagram of another specific instance of a location relationship between two terminals in terminal-to-terminal communication.
Figure 9:
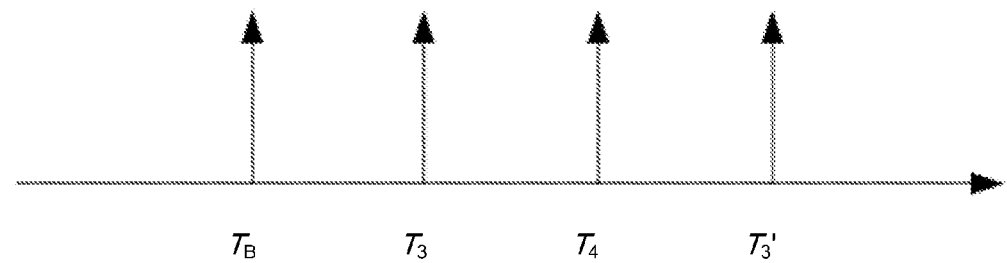
FIG. 9 is a schematic diagram of a timing relationship that two terminals in terminal-to-terminal communication share a downlink frequency of cellular communication.

A method in the scenario 2 is similar to a method in the foregoing scenario 1 in which an uplink frequency of cellular communication is shared. As shown in FIG. 8, a third terminal D2D_UE3 and a fourth terminal D2D_UE4 perform D2D communication in a cell to which a base station belongs. It is assumed that D2D_UE3 sends data at its downlink timing $T_3$ moment, D2D_UE4 receives, at its downlink timing $T_4$ moment, the data sent by D2D_UE3, and the data sent by D2D_UE3 arrives at D2D_UE4 at $T_3'$ moment, as shown in FIG. 9. A downlink timing difference between D2D_UE3 and D2D_UE4 is:

$$\Delta T = T_4 - T_3 = (T_4 - T_B) - (T_3 - T_B) \quad (4)$$

In the foregoing formula (4), $T_B$ is timing of the base station, $T_4 - T_B$ is a time required for data transmission between D2D_UE4 and the base station, and $T_3 - T_B$ is a time required for data transmission between D2D_UE3 and the base station. Then, $T_3' - T_3$ is a time required for data transmission between D2D_UE3 and D2D_UE4. With reference to FIG. 8, according to a geometric theorem, the following may be obtained: a distance between D2D_UE4 and the base station minus a distance between D2D_UE3 and the base station is less than a distance between D2D_UE3 and D2D_UE4, that is:

$$(T_4 - T_B) \times V - (T_3 - T_B) \times V \leq (T_3' - T_3) \times V \quad (5)$$

$$T_4 \leq T_3' \quad (6)$$

In the foregoing formula (5), V is a speed of data transmission. The foregoing formula (6) may be obtained by deduction according to the formula (5). It can be learnt from the foregoing description that, the time $T_3'$ that data sent by D2D_UE3 arrives at D2D_UE4 must be later than the downlink timing $T_4$ of D2D_UE4 (as shown in FIG. 9). In this case, D2D_UE4 may completely receive the data sent by D2D_UE3.

Figure 10:
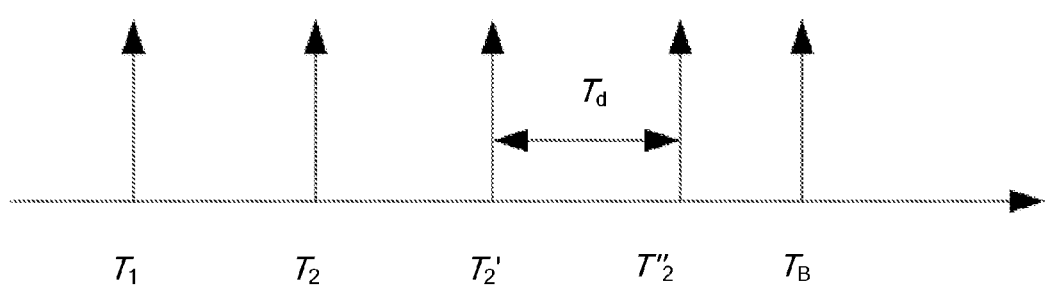
FIG. 10 is a schematic diagram of a relationship between delay extension and each timing when two terminals in terminal-to-terminal communication share an uplink frequency of cellular communication.

In the second condition, a delay that data sent by a sending terminal arrives at a receiving terminal must fall within a CP range of an OFDM symbol corresponding to a signal received by the receiving terminal at uplink timing or downlink timing. A justification process that may use a technical solution provided in embodiments of the present invention to meet the second condition is as follows:

In a technical solution provided in embodiments of the present invention, two D2D communications terminals both send and receive data at their uplink timing or downlink timing, and this solution totally depends on a CP to counteract a receiving delay and multipath delay, thereby avoiding inter-carrier interference and inter-symbol interference. Therefore, a length of a CP restricts a distance of D2D communication. With reference to a D2D communication instance shown in FIG. 6, it is assumed that D2D_UE2 sends data at its uplink timing $T_2$ moment, D2D_UE1 receives, at its uplink timing $T_1$ moment, the data sent by D2D_UE2, and D2D_UE1 receives the data sent by D2D_UE2 at a $T_2'$ moment. It is assumed that a signal delay of D2D_UE2 is extended to $T_2''$, then the delay is extended to $T_d = T_2'' - T_2'$ (as shown in FIG. 10). In this case, a time difference of a delay that the data sent by D2D_UE2 arrives at D2D_UE1 is:

$$\Delta T = |T_2' - T_1 + T_d| = |T_2 - T_{12} - T_1 + T_d| \leq |T_2 - T_1| + T_{12} + T_d \leq 2T_{12} + T_d \quad (7)$$

In the foregoing formula (7), when and only when $T_2 - T_1 = T_d$, an equal sign in the inequality is justified. $T_{12}$ is the time when data is transmitted from D2D_UE2 to D2D_UE1. Generally, it may be considered that $T_d = T_{12}$. In this case, a maximum delay time is $\Delta T_{max} = 3T_{12}$. It can be learnt from the foregoing analysis that, to enable a maximum delay, for which signals of a D2D UE with different transmit signals arrive at a same receiving signal, to fall within a CP range, that is $\Delta T_{max} = 3T_{12} = T_{cp}$, a maximum communication distance is:

$$L_{max} = (T_{cp} \times 3 \times 10^8 \text{ m/s})/3 \quad (8)$$

In the foregoing formula (8), $T_{cp}$ is duration of a CP. Obtained by calculation according to formula (2), for a normal CP type, if a length of time of a normal CP segment is 4.69 microseconds (us), a maximum communication distance is 469 meters (m). For an extended CP type, if a length of time of an extended CP segment is 1.667 us, a maximum communication distance is 1667 m. It can be learnt from the foregoing description that, a first preset distance described in Table 1 of the foregoing second embodiment may be 469 m; and a second preset distance may be set to 1667 m. Further, to ensure quality of communication between D2D communications terminals, it may be chosen that the first preset distance is less than 469 m; and the second preset distance may also be less than 1667 m, and a chosen value may be determined according to practical experience.

It may be obtained from the foregoing justification process that, by using a technical solution provided in embodiments of the present invention, not only D2D communication can be implemented, but also maintenance of D2D communication timing is simplified. In addition, terminals in D2D communication may, according to a distance between two terminals, select a CP type for D2D communication, thereby improving anti-interference performance of D2D communications terminals in receiving and sending data separately at their uplink timing or downlink timing, and effectively avoiding interference between communication signals of different D2D terminals and interference with an uplink signal of a cellular terminal or a downlink signal of a base station.

It should be noted here that, in an actual application, if each subframe in a timing structure of a cell to which a base station belongs include an OFDM symbol of a normal CP type, only when a distance between two terminals in D2D communication, performed by using a method provided in embodiments of the present invention, is less than or equal to 469 m, interference of signals of other D2D communications terminals and interference of uplink signals of other cellular terminals or downlink signals of base stations may be avoided. If each subframe in a timing structure of a cell to which a base station belongs include an OFDM symbol of an extended CP type, only when a distance between two terminals in D2D communication, performed by using a method provided in embodiments of the present invention, is less than or equal to 1667 m, interference of signals of other D2D communications terminals and interference of uplink signals of other cellular terminals or downlink signals of base stations may be avoided. Certainly, if two terminals in D2D communication are in a communication cell that has both an OFDM symbol of a normal CP type and an OFDM symbol of an extended CP type, the two terminals in D2D communication may choose to, according to an actual distance, use a method, described in embodiments provided by the present invention, in an OFDM symbol of a specific type to implement D2D communication.

Figure 11:
FIG. 11 is a schematic diagram of a specific instance of a base station timing structure.

In specific implementation, a base station may control each subframe of the cell, so that in a timing structure of the cell, there are both a subframe of a normal CP type and a subframe of an extended CP type. The base station uses multiple consecutive subframes of a normal CP type as a normal CP group; uses multiple subframes of an extended CP type as an extended CP group, and the normal CP group and the extended CP group are distributed at time intervals, as shown in FIG. 11. A terminal in D2D communication may only perform short-distance D2D communication in a normal CP group; and a terminal in D2D communication may perform long-distance or short-distance D2D communication in an extended CP group. Actually, both uplink timing and downlink timing of each terminal in D2D communication are obtained by synchronization according to timing information sent by a base station. Therefore, uplink timing and downlink timing of each terminal in D2D communication have a same timing structure as that of the base station. By using a method described in the foregoing embodiments provided by the present invention, a terminal that performs D2D communication in the cell may determine, according to an actual distance, that the communication is performed in a normal CP group or an extended CP group. However, to avoid interference of a signal of long-distance communication, performed in an extended CP group, with a signal of short-distance communication, performed in a normal CP group, the terminal in D2D communication cannot send data in a last OFDM symbol of the extended CP group and the OFDM symbol need to be used as a protection interval.

The following further describes, with reference to a specific application example, a case in which a terminal-to-terminal communication method provided in embodiments of the present invention may be used to implement multiple-receiving single-transmitting and multiple-receiving multiple-transmitting.

Figure 12:
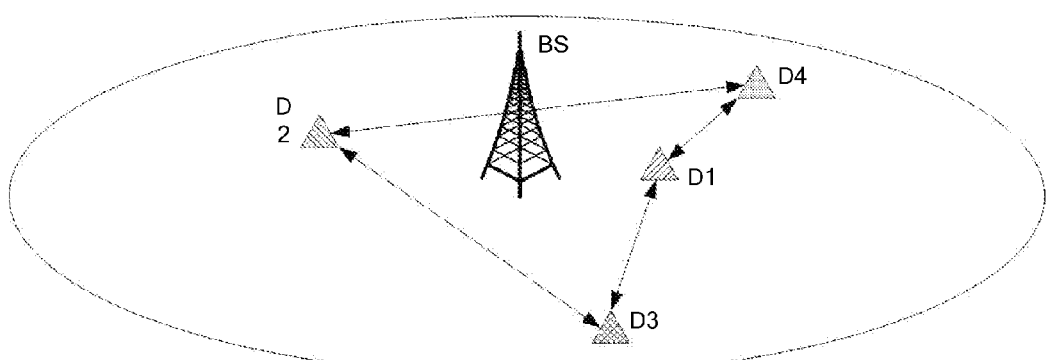
FIG. 12 is a schematic diagram of a location relationship of each terminal in a specific instance of multiple-transmitting single-receiving and multiple-transmitting multiple-receiving that is implemented by using a terminal-to-terminal communication method according to an embodiment of the present invention.
Figure 13:
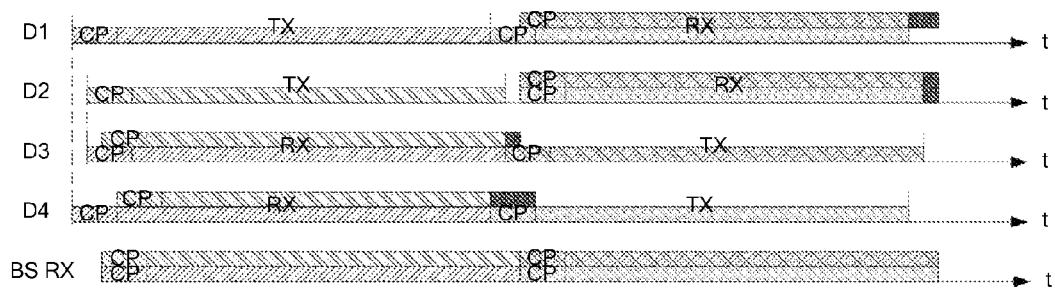
FIG. 13 is a timing structure and transceiver schematic diagram of each terminal in a specific instance of multiple-transmitting single-receiving and multiple-transmitting multiple-receiving that is implemented by using a terminal-to-terminal communication method according to an embodiment of the present invention.

The application example, as shown in FIG. 12, includes a terminal D1, a terminal D2, a terminal D3 and a terminal D4 that perform D2D communication in a cell to which a base station belongs. In the application example, D2D communication shares an uplink of cellular communication. In FIG. 12, each triangle represents a different D2D communications terminal and an arrowhead indicates a flow direction of D2D communication data. As shown in FIG. 13, five timelines in the figure are uplink timing of D1, D2, D3 and D4 and timing of a base station BS respectively. A distance between D1, D2, D3 and D4 and a base station BS is different, and the base station BS needs to receive a signal, sent by D1, D2, D3 and D4, at a same moment. Therefore, the base station BS needs to separately send different timing advance information to D1, D2, D3 and D4. Accordingly, D1, D2, D3 and D4 obtain, according to the received timing advance information sent by the base station, uplink timing, as shown in FIG. 13.

D1 sends, in a time interval of a first OFDM symbol of uplink timing of D1, data to D3 and D4. At the same time, D2 also sends, in a time interval of a first OFDM symbol of uplink timing of D2, data to D3 and D4. D3 and D4 separately receive, at their uplink timing, data sent by D1 and D2. It can be seen from FIG. 13 that, D3 receives, in a time interval of a first OFDM symbol of uplink timing of D3, data sent by D1, and a moment when the data sent by D1 arrives at D3 is exactly equal to a start time of a first OFDM symbol of uplink timing of D3. Meanwhile, D3 also receives, in a time interval of a first OFDM symbol of uplink timing of D3, data sent by D2. It can be seen from the figure that, a moment when data sent by D2 arrives at D3 is later than start time of a first OFDM symbol of uplink timing of D3, and a moment when the data sent by D2 arrives at D3 does not fall outside a CP range of a first OFDM symbol of uplink timing of D3, and therefore data that is sent by D2 and received by D3 does not interfere with data that is sent by D1 and received by D3. D3 receives, in a first OFDM symbol of uplink timing of D3, data sent by D1 and D2. If the data sent by D1 and D2 falls outside a first OFDM symbol of uplink timing of D3 because of transmission delay and multipath expansion, as shown in a black grid part in FIG. 13, D3 does not process data in this part.

Similarly, as shown in FIG. 13, D4 receives, in a time interval of a first OFDM symbol of uplink timing of D4, data sent by D1, and a moment when the data sent by D1 arrives at D4 is exactly equal to the start time of a first OFDM symbol of uplink timing of D4. Meanwhile, D4 also receives, in a time interval of a first OFDM symbol of uplink timing of D4, data sent by D2. It can be seen from the figure that, a moment when the data sent by D2 arrives at D4 is later than a start time of a first OFDM symbol of uplink timing of D4, and a moment when the data sent by D2 arrives at D3 is exactly equal to the time indicated by a CP in a first OFDM symbol of uplink timing of D3, and therefore data that is sent by D2 and received by D4 does not interfere with data that is sent by D1 and received by D4. Similarly, D4 receives, in a first OFDM symbol of uplink timing of D4, data sent by D1 and D2. If the data sent by D1 and D2 falls outside a first OFDM symbol of uplink timing of D4 because of transmission delay and multipath expansion, as shown in a black grid part in FIG. 13, D4 does not process data in this part.

As shown in FIG. 13, when D3 and D4 send data in their second OFDM symbol of uplink timing, because both D3 and D4 do not process data that falls outside their first OFDM symbol of uplink timing, D3 and D4 do not need to take an RX/TX switch time interval between receiving and sending data, and both D3 and D4 may directly send data in their second OFDM symbol of uplink timing, thereby avoiding an overhead of RX/TX switch time in the prior art. As shown in this figure, D3 sends, in its second OFDM symbol of uplink timing, data to D1 and D2, and D4 sends, in its second OFDM symbol of uplink timing, data to D1 and D2. Same as the process in which D1 sends data to D3 and D4, and D2 sends data to D3 and D4, as shown in FIG. 13, D1 and D2 separately receive, at their uplink timing, data sent by D3 and D4 without incurring mutual interference.

It can be learnt from the foregoing description that, a terminal-to-terminal communication method provided in each embodiment of the present invention may be applicable to multiple-transmitting single-receiving and multiple-transmitting multiple-receiving cases.

Persons of ordinary skill in the art may understand that, all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random access memory (RAM), a magnetic disk, or an optical disc.

Figure 14:
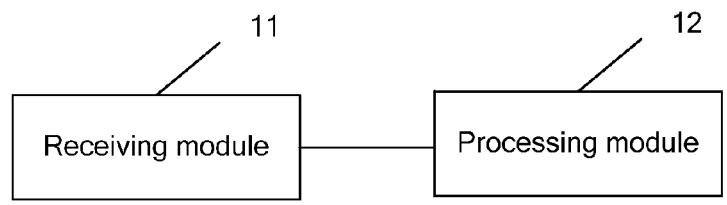
FIG. 14 is a schematic structural diagram of a first embodiment of a terminal according to the present invention.

FIG. 14 is a schematic structural diagram of a first embodiment of a terminal according to the present invention. As shown in FIG. 14, the terminal described in the first embodiment includes: a receiving module 11 and a processing module 12. The receiving module 11 is configured to receive data in a first OFDM symbol, where the data is sent, in a second OFDM symbol, by a peer terminal that performs terminal-to-terminal communication with the terminal, the first OFDM symbol is synchronized by the terminal according to first timing information sent by a base station, and the second OFDM symbol is synchronized by the peer terminal according to second timing information sent by the base station. The processing module 12 is configured to, if the first OFDM symbol is not synchronized with the second OFDM symbol, skip processing residual data that is sent by the peer terminal in the second OFDM symbol and that exceeds a time indicated by the first OFDM symbol.

A terminal described in the first embodiment, when implementing D2D communication with other terminals, sends and receives data always at its uplink timing or downlink timing, thereby avoiding a problem in the prior art that a D2D terminal at a receive end needs to maintain receive timing by using a complex synchronization process, and simplifying maintenance of D2D communication timing. In addition, in the terminal described in the first embodiment, a manner of skipping processing residual data is further used, thereby avoiding an overhead problem in the prior art that a D2D communications terminal requires an RX/TX switch time between receiving a signal and sending a signal. The terminal described in this embodiment may immediately start to send a signal in a next symbol at its uplink timing or downlink timing, without requiring the RX/TX switch (RX/TX Switch) time in the prior art, thereby reducing waste of time. In addition, because the terminal described in this embodiment does not need to align with transmit timing of a D2D terminal at a transmit end when receiving a signal, the terminal described in this embodiment may simultaneously receive data sent by multiple different peer terminals.

Further, the processing module described in the foregoing embodiment is specifically configured to: if the first OFDM symbol is not synchronized with the second OFDM symbol, receive, in a next OFDM symbol of the first OFDM symbol, residual data that is sent by the peer terminal in the second OFDM symbol and that exceeds the time indicated by the first OFDM symbol, but skip processing the residual data. Alternatively, the processing module is specifically configured to: if the first OFDM symbol is not synchronized with the second OFDM symbol, skip receiving and skip processing, in a next OFDM symbol of the first OFDM symbol, residual data that is sent by the peer terminal in the second OFDM symbol and that exceeds the time indicated by the first OFDM symbol.

Figure 15:
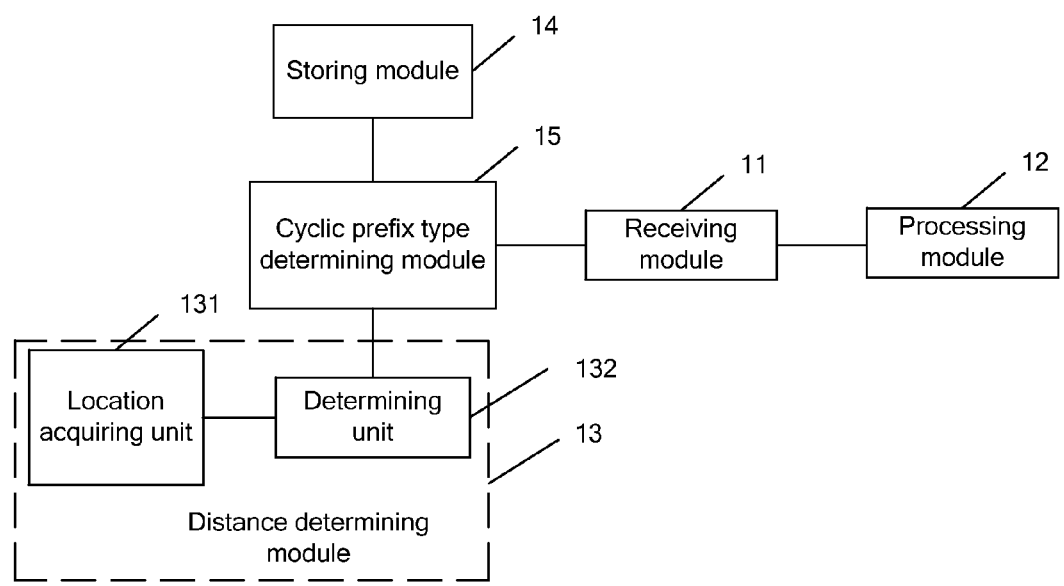
FIG. 15 is a schematic structural diagram of a second embodiment of a terminal according to the present invention.

Terminals provided by this embodiment of the present invention may perform D2D communication separately at their uplink timing or downlink timing, and totally depend on a CP to counteract a receiving delay and multipath delay, thereby avoiding inter-carrier interference and inter-symbol interference. It can be learnt from the foregoing description that, a length of a CP restricts a distance between two terminals that use a technical solution provided by the present invention to perform D2D communication separately at their uplink timing or downlink timing. Therefore, FIG. 15 shows a schematic structural diagram of a second embodiment of a terminal according to the present invention. The terminal described in the second embodiment, on the basis of the foregoing first embodiment, further includes: a distance determining module 13, a storing module 14, and a cyclic prefix type determining module 15. In the terminal described in the second embodiment, a distance between the terminal and a peer terminal is determined, and a cyclic prefix type of an OFDM symbol is determined according to the distance, so that the terminal and the peer terminal implement D2D communication in the OFDM symbol of the determined cyclic prefix type separately at their uplink timing or downlink timing, thereby effectively avoiding interference from other D2D terminal signals and uplink signals of other cellular terminals or downlink signals of base stations.

The distance determining module 13 is configured to determine a distance between the terminal and the peer terminal. The storing module 14 is configured to store a correspondence between a distance and a cyclic prefix type of an OFDM symbol. The cyclic prefix type determining module 15 is configured to determine, according to the correspondence between a distance and a cyclic prefix type of an OFDM symbol, a cyclic prefix type of an OFDM symbol that corresponds to the distance and is determined by the distance determining module. Accordingly, the receiving module 11 described in the foregoing first embodiment is configured to receive data in a first OFDM symbol that has the determined cyclic prefix type. The correspondence between a distance and a cyclic prefix type of an OFDM symbol, as described in the foregoing Table 1, includes: If the distance is less than or equal to a first preset distance, the cyclic prefix type of the OFDM symbol is a normal cyclic prefix type or an extended cyclic prefix type; or if the distance is greater than a first preset distance and is less than or equal to a second preset distance, the cyclic prefix type of the OFDM symbol is an extended cyclic prefix type.

Further, as shown in FIG. 15, the instance determining module 13 in the foregoing second embodiment includes: a location acquiring unit 131 and a determining unit 132. The location acquiring unit 131 is configured to acquire location information of the peer terminal. The determining unit 132 is configured to determine the distance between the terminal and the peer terminal according to the location information. Specifically, the location acquiring unit may acquire, by receiving a discovery subframe sent by the peer terminal, location information of the peer terminal. The discovery subframe carries the location information of the peer terminal. Alternatively, the location acquiring unit may also acquire the location information of the peer terminal by using a GPS.

A technical solution provided by each embodiment of the present invention may be applied to various communications systems, for example, a Global System for Mobile Communications (GSM), general packet radio service (GPRS) system, Code Division Multiple Access (CDMA) system, CDMA2000 system, Wideband Code Division Multiple Access (WCDMA) system, Long Term Evolution (LTE) system or Worldwide Interoperability for Microwave Access (WiMAX) system.

A base station in a technical solution provided by each embodiment of the present invention may be a base transceiver station (BTS) in a GSM system, GPRS system or CDMA system, a NodeB in a CDMA2000 system or WCDMA system, an evolved NodeB (eNB) in an LTE system, or an access service network base station (ASN BS) in a WiMAX network, and other network elements.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A terminal-to-terminal communication method, comprising:
   determining, by a first terminal, a distance between the first terminal and a second terminal;
   determining, by the first terminal, a cyclic prefix type of an orthogonal frequency division multiplexing (OFDM) symbol by comparing the distance to preset distances corresponding to a plurality of cyclic prefix types, wherein the OFDM symbol received in a first OFDM symbol timing has the determined cyclic prefix type;
   determining, by the first terminal, a data receiving mode corresponding to the cyclic prefix type and according to the determined distance;
   receiving, by the first terminal, data in the first OFDM symbol timing according to the data receiving mode, wherein the data is sent by the second terminal in a second OFDM symbol, wherein the first OFDM symbol timing is synchronized by the first terminal to first uplink or downlink timing information sent by a base station, and wherein the second OFDM symbol is synchronized by the second terminal to second uplink or downlink timing information sent by the base station;
   skipping receiving, by the first terminal in a next OFDM symbol timing after the first OFDM symbol timing when the first OFDM symbol timing is not synchronized with the second OFDM symbol, residual data that is sent by the second terminal in the second OFDM symbol, but arrives at the first terminal after the first OFDM symbol timing due to transmission delay or multipath expanding; and
   skipping processing, by the first terminal in the next OFDM symbol timing after the first OFDM symbol timing when the first OFDM symbol timing is not synchronized with the second OFDM symbol, the residual data that is sent by the second terminal in the second OFDM symbol and that exceeds the time indicated by the first OFDM symbol timing.

2. The terminal-to-terminal communication method according to claim 1, wherein the distance is less than or equal to a first preset distance, and wherein the cyclic prefix type of the OFDM symbol is a normal cyclic prefix type.

3. The terminal-to-terminal communication method according to claim 1, wherein the distance is less than or equal to a first preset distance, and wherein the cyclic prefix type of the OFDM symbol is an extended cyclic prefix type.

4. The terminal-to-terminal communication method according to claim 1, wherein the distance is greater than a first preset distance and less than or equal to a second preset distance, and wherein the cyclic prefix type of the OFDM symbol is an extended cyclic prefix type.

5. The terminal-to-terminal communication method according to claim 1, wherein the determining, by the first terminal, the distance between the first terminal and the second terminal comprises:

acquiring, by the first terminal, location information of the second terminal; and determining, by the first terminal, the distance between the first terminal and the second terminal according to the location information.

6. A terminal, comprising:

a receiver configured to receive data in a first orthogonal frequency division multiplexing (OFDM) symbol, wherein the data is sent in a second OFDM symbol by a peer terminal that performs terminal-to-terminal communication with the terminal, wherein the first OFDM symbol timing is synchronized by the terminal to first uplink or downlink timing information sent by a base station, and wherein the second OFDM symbol is synchronized by the peer terminal to second uplink or downlink timing information sent by the base station;

a processor coupled to the receiver and configured to:

skip receiving, in a next OFDM symbol timing after the first OFDM symbol timing when the first OFDM symbol timing is not synchronized with the second OFDM symbol, residual data that is sent by the peer terminal in the second OFDM symbol, but arrives at the terminal after the first OFDM symbol timing due to transmission delay or multipath expanding;

skip processing, in the next OFDM symbol timing after the first OFDM symbol timing, the residual data that is sent by the peer terminal in the second OFDM symbol and that exceeds the time indicated by the first OFDM symbol timing when the first OFDM symbol timing is not synchronized with the second OFDM symbol;

determine a distance between the terminal and the peer terminal;

and a memory coupled to the processor and configured to store a correspondence between the distance and a cyclic prefix type of an OFDM symbol, wherein the processor is further configured to:

determine, the cyclic prefix type of the OFDM symbol that corresponds to the distance by comparing the distance to preset distances corresponding to a plurality of cyclic prefix types; and determine, a data receiving mode corresponding to the determined cyclic prefix type and according to the distance, and wherein the receiver is further configured to receive the data in the first OFDM symbol timing that has the determined cyclic prefix type and according to the data receiving mode.

7. The terminal according to claim 6, wherein the processor is further configured to:

acquire location information of the peer terminal; and determine the distance between the terminal and the peer terminal according to the location information.

* * * * *